Jan. 6, 1953  R. GOUIRAND  2,624,594
PNEUMATIC SUSPENSION FOR VEHICLES
Filed June 22, 1946  2 SHEETS—SHEET 1
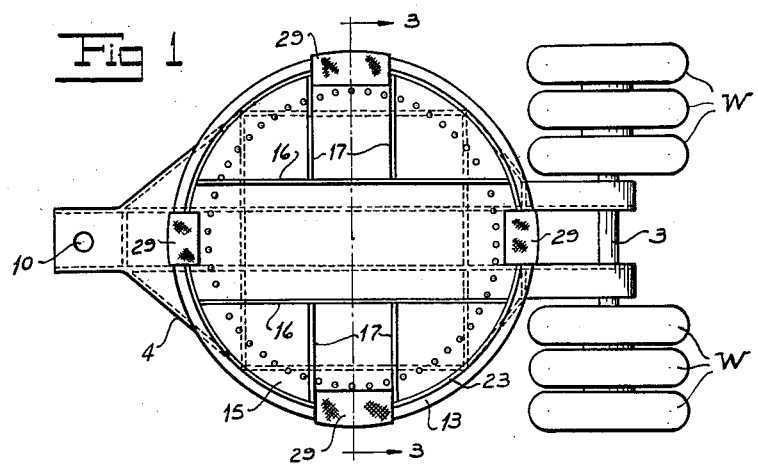
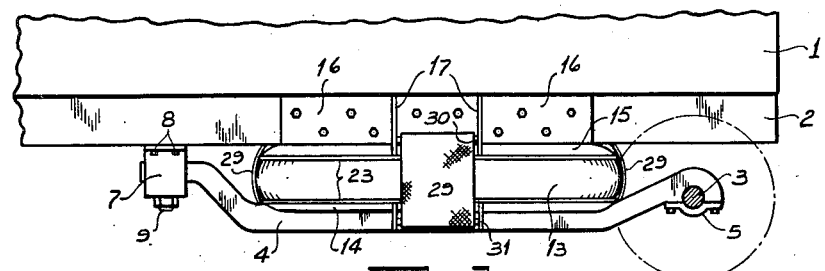
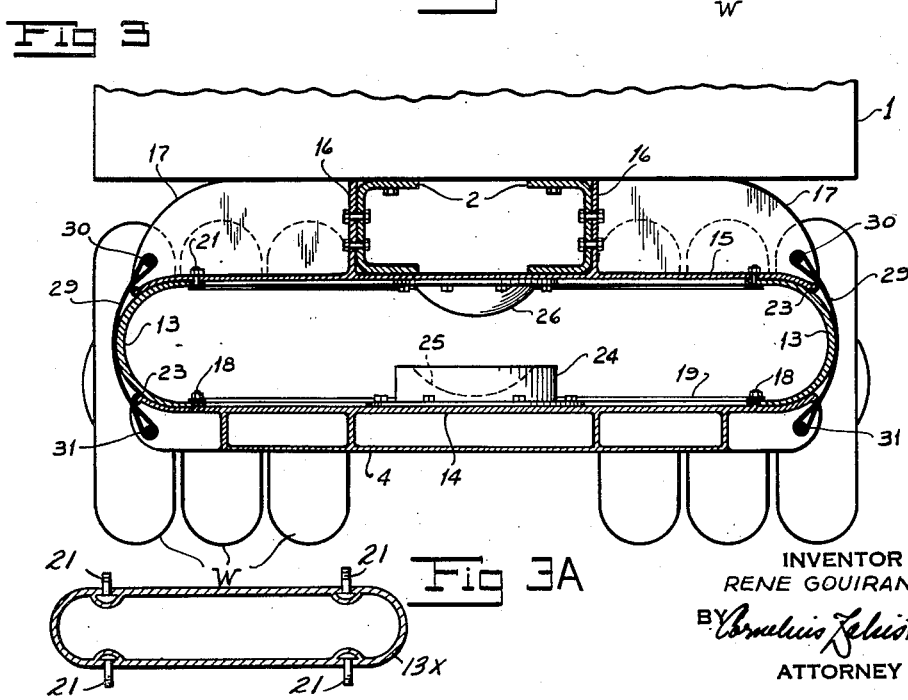
INVENTOR
RENE GOUIRAND
BY
ATTORNEY Jan. 6, 1953    R. GOUIRAND    2,624,594
PNEUMATIC SUSPENSION FOR VEHICLES
Filed June 22, 1946    2 SHEETS—SHEET 2
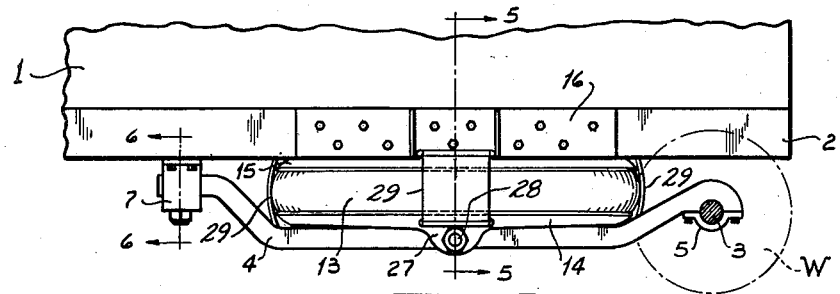
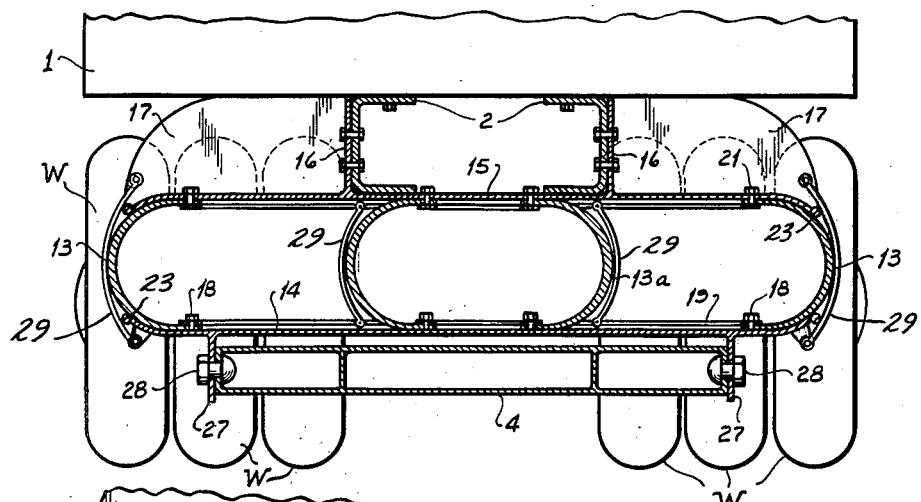
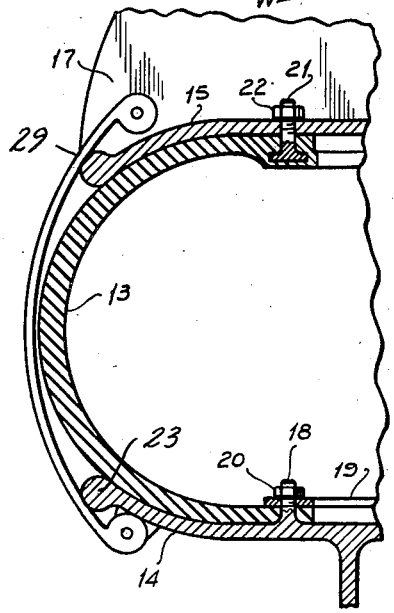
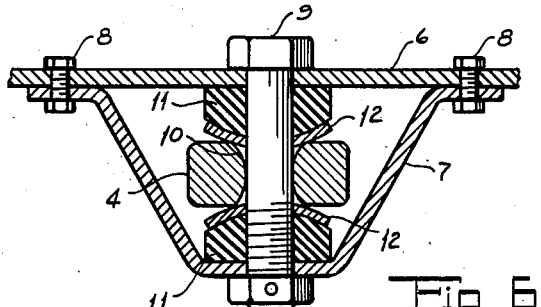
INVENTOR
RENE GOUIRAND
BY Cornelius Fabritius
ATTORNEY Patented Jan. 6, 1953

2,624,594

UNITED STATES PATENT OFFICE 2,624,594

PNEUMATIC SUSPENSION FOR VEHICLES

Rene Gouirand, New York, N. Y.

Application June 22, 1946, Serial No. 678,605

14 Claims. (Cl. 280—124)

1

This invention is a vehicle suspension and relates to the suspension of motor vehicles although certain features herein set forth are applicable to railway loading stock.

More particularly the invention has to do, generally speaking, with the interposition of pneumatic cushions between the wheel axles and the chassis frame or body of the vehicle, to take the place of the usual steel springs heretofore generally employed to cushion the chassis and body against road shocks.

In my prior Patents Nos. 1,555,199 of September 29, 1925, and 2,042,596 of June 2, 1936, pneumatic suspensions are disclosed, wherein cushions are provided in the places normally occupied by the springs of a vehicle, i. e., at the opposite sides of the vehicle adjacent the wheels thereof. When cushions are thus located, they must necessarily be relatively small in order to permit of sufficient road clearance and it is generally not desirable to so make them that they occupy much more space than the conventional springs. When cushions are made in these sizes, they require relatively high pressure in order to sustain heavy loads, particularly for trucks, and the desired effect of low pressure pneumatic cushions is not obtained.

In my pending application, Serial No. 620,767, filed October 6, 1945, which became Patent No. 2,488,288 issued November 15, 1949, a marked advance has been disclosed, wherein the pneumatic cushions, instead of being positioned upright at the opposite sides of the vehicle, are made very considerably larger than has heretofore been possible and are arranged in a horizontal plane between the axle and the chassis frame and extend practically from wheel to wheel, so that a relatively broad expanse of cushion support is obtained. This arrangement constitutes a marked advance over the structure of my said earlier patents, for it permits the use of relatively low pressures while giving adequate support for widely varying loads. In the manufacture of trucks, there has been an ever increasing tendency to widen the body of the truck so as to permit maximum body space for the loading of articles and particularly light articles. The overall width of the wheel tread is fixed by the laws of many of the states, but it is not uncommon that the body of the vehicle be extended beyond the width of the tread.

The structure of my pending application permits of the support of the body of a truck, having only two rear tires, for the greater portion of the width of the body, but for dual wheel con-

2 struction where two or more tires are associated with each end of the rear axle, the size of the horizontally disposed cushion, which lies between two inner wheels, is necessarily so limited that such a cushion will not furnish adequate support for the full width of the body. Consequently, side sway or unequal loading of the body may place undue strain upon the horizontal cushion and there may be a top heavy condition in the vehicle.

The primary object of the present invention is to provide a pneumatic suspension wherein a cushion, horizontally disposed between the axle and the chassis frame or body, may be made as wide as or even wider than the body itself so that said cushion, in effect, underlies the entire width of the body. It need not be coextensive with the body or even as wide as the body, but, in accordance with the present invention, said cushion may be sufficiently large to adequately support the body for substantially its full width even though two, three or four wheels are provided at each end of the rear axle. A cushion of such ample dimensions will effectually support either light or heavy loads, even though these loads are not properly distributed transversely of the vehicle and for even heavy loads the pressures employed in the cushion may be surprisingly low. By employing these low pressures much easier riding is obtained, for road shocks will not be transmitted to the chassis frame or body.

These advantages are made possible in accordance with the present invention by securing the rear axle, in the case of a truck or motor vehicle, at the rear end of a cradle, positioned below the chassis frame and extending from the rear axle to a point well forwardly thereof with the forward end of the cradle pivotally secured to the chassis frame and introducing, between the cradle and the chassis frame, a horizontal cushion of ample dimensions so disposed as to be positioned mainly forwardly of the rear wheels of the vehicle. The weight of the chassis frame body and load is transmitted through the horizontal pneumatic cushion to the cradle and serves to support the rear portion of the body above the rear axle. The cradle operates, in effect, as a lever of the third class, fulcrumed at one end to the body of the vehicle with the work arm extending all the way from its fulcrum to the rear axle and with the power or supporting force transmitted to the lever intermediate the fulcrum and said axle.

This arrangement has several advantages. For example, it so positions the horizontal cushion that it will be out of the way of the wheels. Also it permits relatively little compression of the cushion for a relatively greater vertical movement of the wheel axle, so that the cushioning effect of the cushion will be enhanced by the leverage connections described. In other words, vertical movement of the axle will not cause the same amount of vertical compression of the cushion but, through the leverage referred to, will result in appreciably less vertical movement thereof with corresponding less vertical movement of the chassis frame. This not only results in easier riding, but permits of utilization of much lower pressures than heretofore found possible in pneumatic suspensions previously used. Likewise this structure permits considerable latitude in design of the chassis frame to different heights from the road surface.

In conjunction with the foregoing features, the present invention also includes means, hereinafter described in detail, whereby the pressure in the cushion may be increased or decreased automatically in accordance with load requirements or manually controlled according to the will of the operator.

Features of the invention, other than those adverted to, will be apparent from the hereinafter detailed description and appended claims, when read in conjunction with the accompanying drawings.

The accompanying drawings illustrate different practical embodiments of the invention, but the constructions therein shown are to be understood as illustrative, only and not as defining the limits of the invention.

Figure 1 is a plan view of a pneumatic suspension unit embodying the present invention removed from the chassis frame and body.

Figure 2 is a side elevation of the structure shown in Figure 1 with the rear axle broken away in the interests of clearness.

Figure 3 is a section on the line 3—3 of Figure 1.

Figure 3A is a cross section of a modified form of cushion.

Figure 4 is a view corresponding to Figure 2, but showing a modified form of the invention.

Figure 5 is a section on the line 5—5 of Figure 4.

Figure 6 is a fragmental section on the line 6—6 of Figure 4.

Figure 7 is a fragmental section corresponding to a portion of the section shown in Figure 5, but on a sufficiently enlarged scale to show certain details of attachment for the cushion.

In the accompanying drawings, referring first to Figures 1–3 inclusive, 1 designates the body of a vehicle, 2 the chassis frame and 3 the rear axle, all of which parts may be of conventional form.

Positioned beneath the rear end portion of the chassis frame is a cradle 4 which may be in the form of a casting, a die stamping or may be structurally fabricated. In any event, it is so constructed that its rear end may be secured to the rear axle, as indicated at 5, while its front end may be so secured to the chassis frame as to permit of pivotal movement of the cradle in an up and down direction and thus allow vertical relative movement between the rear axle and the chassis frame.

The anchorage of the chassis frame may vary in detail, but one convenient and highly satisfactory form is shown in detail in Figures 2 and 6. Extending across the under side of the chassis frame is a strap 6, firmly secured to the frame. Depending from the central portion of this strap is a hanger 7, which may be conveniently bolted thereto, as indicated at 8, and mounted in the strap 6 and hanger 7, is an anchor bolt 9. The forward end of the cradle 4 is perforated, as shown at 10, for the passage of said anchor bolt and elastic cushions, which may be in the form of springs, but are here shown as rubber cushions 11 positioned above and below the pivoted end of the cradle and protected from undue friction and wear by arcuate metal washers 12, as best shown in Figure 6. This form of mounting firmly anchors the forward end of the cradle to the chassis frame, while permitting relative vertical movement between the rear end of the chassis frame and the rear axle and some side sway without binding or undue wear of the parts.

Intermediate the rear axle and the forward anchorage of the cradle, said cradle is broadened out to provide a firm underlying support for a bearer plate or bearer 14, which, if desired may be stamped from sheet metal and secured upon the cradle or may be formed as a structurally inherent part thereof. It is thus shown in the accompanying drawings, and more particularly in Figure 3, wherein it is of ribbed box-like form in order to have the necessary strength and minimum weight. This bearer 14 constitutes the lower bearer for the horizontal pneumatic cushion and above and axially alined therewith is an upper bearer 15 of the same size and shape and provided with upstanding flanges 16 and 17. The flanges 16 are parallel to one another and adapted to lie against the outer sides of the channel beams of the chassis frame 2, as shown best in Figures 2 and 3, and they are bolted to these channel beams in order to secure the upper bearer to the chassis frame in a rigid manner. The upstanding flanges 17 extend in a lateral direction and underlie the laterally projecting portions of the body 1, so as to effectually support the body for substantially its full width (see Figure 3) and relieve the flanges 16 from torsional strains which might otherwise be transmitted to these flanges by rolling movement of the body during travel of the vehicle. The flanges 17 may be attached to the body, if desired, but, in practice, this is found unnecessary.

Between the upper and lower bearers 15 and 14, respectively, is positioned a horizontal pneumatic cushion 13, which may be made of any suitable material well adapted for the purpose, but is preferably constructed of vulcanized rubber and cord or fabric, after the manner of automobile and aviation tires. The pneumatic cushion may, per se, be made in the form of a closed, normally sealed chamber, as shown at 13X in Figure 3A, so that the fabric and rubber walls thereof will entirely enclose and contain compressed air for cushioning purposes. However, I have found it entirely practical to make this cushion in the form of an annulus of axial curvilinear cross section and to attach the inner margins of the annulus to the upper and lower bearers in leak-proof joints, so that the opposing horizontal walls of these bearers constitute the upper and lower walls of the cushion.

One manner in which this may be conveniently accomplished is shown in Figure 7. Here the lower bearer 14 is provided, in spaced relation to its outer periphery, with a closely spaced apart annular series of upstanding threaded lugs 18. The rubber cushion 13 is provided with correspondingly placed holes along the inner margin of its lower rim and these holes are adapted to be passed over the lugs 18 to cause the lower rim portion of the rubber section to seat upon the lower bearer. Thereafter a metal ring 19 is seated on said lower rim and nuts 20 are screwed tight onto the lugs to form a leak-proof joint between the lower bearer and the lower rim of the rubber element.

Near the inner periphery of the upper rim of the cushion 13, a series of upstanding threaded lugs 21 are vulcanized into the rim and are adapted to project through correspondingly placed holes in the upper bearer 15. When bolts 22 are thereafter screwed down tightly upon these lugs 21, a leak-proof joint will be provided.

Both the upper and lower bearers may be substantially flat throughout the greater portion of their area, but at their marginal portions, they are preferably curved into substantial conformity with the normal shape of the cushion, so as to form a substantially concave seat therefor at both the lower and upper portions thereof. The outer edges of both bearers may be curled or thickened, as shown at 23, so that these edges will not tend to dig into or unduly abrade the rubber member, particularly under heavy loads.

It will be noted that the horizontal cushion, formed by the upper and lower bearers and the interposed rubber cushion part, as hereinbefore described, are positioned well forwardly of the rear wheels W, so as to provide for adequate clearance between these wheels and the cushion under all conditions of operation. This makes it possible, as very clearly shown in Figures 1–3, to utilize a six wheel rear axle, and even more wheels may be added, without interfering with the proper functioning of the present invention. It is to be understood, however, that this invention is not limited to dual or treble wheel construction, but has numerous advantages which will be readily appreciated by those skilled in the art, even when the same is used with a two wheel axle. By positioning the cushion as described, however, it is possible under all conditions to make this cushion of a sufficient size to underlie the entire width of the body of the vehicle.

As hereinbefore pointed out, a cushion of such ample proportions and a horizontal plane to underlie substantially the entire width of the body, will effectually support the body against side sway or tilting due to uneven loading or to centrifugal force on curves or on a highly banked roadway. There will be no tendency of the vehicle to turn over under such conditions, even when relatively low pressures are used in the cushion.

There is a possibility that, due to accidents or collision, the pneumatic cushion may be punctured. In order to permit the vehicle to be operated in such event, there is preferably provided, within the cushion, an emergency device which will support the rear end of the vehicle. In Figure 3, this emergency means consists in a lower bumper 24, mounted at the center of the lower bearer 14 and having a concavity 25 in its upper surface into which a convex bumper 26, mounted on the underside of the upper bearer, may seat and thus support the rear end of the vehicle, so that it may be driven to a repair point.

A modified form of emergency means is shown in Figure 5, wherein a central cushion 13a is positioned within the main horizontal cushion and will serve to allow movement of the vehicle even though the main cushion is injured. The pressure within this central cushion is preferably maintained constant at all times.

In the structures shown in Figures 1–3, the lower bearer forms an inherent part of the cradle and is rigidly supported with respect thereto. However, this need not be so for, if desired, the lower bearer 14 may be pivotally mounted on the cradle 4, as shown in Figures 4 and 5. Here the lower bearer is provided at its opposite lateral sides with depending brackets 27, pivotally secured to the opposite sides of the cradle by bolts 28, so as to permit of oscillatory movement of the lower bearer on a transverse axis with respect to the cradle. The advantage of this structure is that both the upper and lower bearers may, at all times, partake of parallel horizontal planes irrespective of pivotal movement of the cradle which will result from rising and falling of the rear axle when passing over bumpy roads.

It is found, in practice that, when the large cushion of this invention is employed, it effectually takes up side sway of the body and there is little, if any, tendency for the body to laterally shift with respect to the path of tread of the wheels. However, as a precautionary measure against severe conditions which might tend to place a strain upon the elastic cushion element 13, there is preferably provided a mechanical linkage between the upper and lower bearers. This linkage may conveniently be in the form of flexible straps 29 shown in Figures 1–3. These are looped about pins 30 carried by the upper bearer and about pins 31 carried by the lower bearer. These straps may be of rubber impregnated vulcanized fabric or metal, as desired. They have several functions: should the body attempt to move laterally with respect to the wheels, they will bind against the side of the rubber element of the cushion and preclude such movement and thus take the strain off of upper and lower studs 18 and 21. If the vehicle passes over a bump in the road which has a tendency to throw the body upwardly, these straps 29 will act as snubbers, so that there will be no possibility of tearing the bearers away from the elastic element 13 of the cushion. Also, when the vehicle strikes a pronounced bump in the road and a sudden strain is put on the cushion, particularly under heavy loads, the members 29 will serve to hold in and confine the elastic member 13 and minimize the possibility of a blow-out.

The straps 29 are not shown in Figures 4–7, but may be added to this construction if desired. They are not absolutely essential, in practice, but may be advantageously employed. Also the straps 29 may be associated with the inner cushion 13a of Figure 5, so as to be concealed within the outer cushion, if so desired.

In the foregoing detailed description I have set forth the present invention as constituting a pneumatic suspension interposed between the vehicle chassis or body and the rear axle. More specifically, I have shown the body as mounted upon a separate chassis frame as this is conventional. It has, however, been suggested in vehicle construction that the chassis frame form part and parcel of the body in order to eliminate the use of a separate chassis frame and thus economize in weight and cost. It will be understood that the present invention may be associated with a vehicle of the latter type.

The foregoing detailed description sets forth the present invention in certain of its preferred practical forms, but the invention is to be understood as fully commensurate with the appended claims.

Having thus fully described the invention, what I claim as new and desire to secure by Letters Patent is:

1. A vehicle comprising a body, a wheeled axle beneath said body, and a horizontally disposed weight carrying pneumatic cushion interposed between the axle and the body forwardly of the wheels and of greater width in a direction transversely of the vehicle than the distance between the wheels of said axle.

2. A vehicle comprising a body, a wheeled axle beneath said body, a lever extending longitudinally of the body with one end of the lever secured to the axle and the other end of the lever pivotally mounted with respect to the body, and a horizontally disposed weight carrying pneumatic cushion forwardly of the wheels of said axle and interposed between the body and the lever intermediate the ends of the latter, said pneumatic cushion being of greater width than the distance between the wheels of said axle.

3. A vehicle comprising a body, a wheeled axle beneath said body, a lever extending longitudinally of the body with one end of the lever secured to the axle and the other end of the lever pivotally mounted with respect to the body, a lower bearer mounted on said lever intermediate the ends of the latter, a coaxially disposed upper bearer carried by the body, and a horizontally disposed load carrying cushion positioned between said lower and upper bearers, said load carrying pneumatic cushion being of greater width than the distance between the wheels of said axle, said cushion being positioned forwardly of the wheels of the vehicle.

4. A vehicle comprising a body, a wheeled axle beneath the body, and a horizontally disposed weight carrying pneumatic cushion interposed between the axle and the body and located wholly forwardly of the axle and of greater width in a direction transversely of the vehicle than the distance between the wheels of said axle.

5. A vehicle comprising a body, a wheeled axle beneath the body, and a horizontally disposed weight carrying pneumatic cushion interposed between the axle and the body and located in spaced relation to the axle in the direction of the length of the vehicle and of greater width in a direction transversely of the vehicle than the distance between the wheels of said axle.

6. A vehicle comprising a body having a frame, a wheeled axle beneath said frame, a cradle positioned below the frame with one end of the cradle secured to the axle and its other end secured to the frame, a lower cushion bearer carried by the cradle intermediate the ends of the latter, said cushion bearer being laterally centralized beneath the frame and extending transversely thereof and underlying a greater portion of the width of the body and said bearer being of substantially the same fore and aft dimension, an upper cushion bearer coextensive and alined with the lower bearer and secured to the frame above the latter, and a pneumatic weight carrying cushion substantially co-extensive with said bearers and interposed between them, said cushion being vertically relatively shallow and serving to support the body above the cradle for the greater portion of the width of the body, said bearers and cushion being located in a position longitudinally of the vehicle to space them from contact with the wheels of said axle.

7. A vehicle comprising: a body having a frame, a wheeled axle beneath said frame, a cradle positioned below the frame with one end of the cradle secured to the axle and its other end secured to the frame, a generally circular lower cushion bearer carried by the cradle intermediate the ends of the latter and extending transversely of the body and of a diameter to underlie the greater portion of the width of the body, an upper cushion bearer coextensive with the lower bearer and secured to the frame above the lower bearer, and a circular weight carrying cushion positioned between said bearers and substantially coextensive therewith, said cushion being of a relatively shallow depth and underlying the major portion of the width of the body, said bearers and cushion being located in a position longitudinally of the vehicle to space them from contact with the wheels of said axle.

8. A vehicle comprising: a body having a frame, a wheeled axle beneath said frame, a cradle positioned below the frame with one end of the cradle secured to the axle and its other end secured to the frame, a lower cushion bearer carried by the cradle intermediate the ends of the latter, said cushion bearer being laterally centralized beneath the frame and extending transversely thereof and underlying a greater portion of the width of the body and said bearer being of substantially the same fore and aft dimension, an upper cushion bearer coextensive and alined with the lower bearer and secured to the frame above the latter, a pneumatic weight carrying cushion substantially coextensive with said bearers and interposed between them, said cushion being vertically relatively shallow and serving to support the body above the cradle for the greater portion of the width of the body, and flexible ties connecting the upper and lower bearers at their opposite sides and fore and aft and closely embracing the periphery of the cushion, said flexible ties being substantially taut under all degrees of compression of the cushion to take up side sway of the body, aline the wheels and act as snubbers.

9. A vehicle comprising: a body having a frame, a wheeled axle beneath said frame, a cradle positioned below the frame with one end of the cradle secured to the axle and its other end secured to the frame, a generally circular lower cushion bearer carried by the cradle intermediate the ends of the latter and extending transversely of the body and of a diameter to underlie the greater portion of the width of the body, an upper cushion bearer coextensive with the lower bearer and secured to the frame above the lower bearer, a circular weight carrying cushion positioned between said bearers and substantially coextensive therewith, said cushion being of a relatively shallow depth and underlying the major portion of the width of the body, and flexible ties connecting the upper and lower bearers at their opposite sides and fore and aft and closely embracing the periphery of the cushion, said flexible ties being substantially taut under all degrees of compression of the cushion to take up side sway of the body, aline the wheels and act as snubbers.

10. A vehicle comprising: a body having a frame, a wheeled axle beneath said frame, a cradle positioned below the frame with one end of the cradle secured to the axle and its other end secured to the frame, a lower cushion bearer carried by the cradle intermediate the ends of the latter, said cushion bearer being laterally centralized beneath the frame and extending transversely thereof and underlying a greater portion of the width of the body and said bearer being of substantially the same fore and aft dimension, an upper cushion bearer coextensive and alined with the lower bearer and secured to the frame above the latter, and a pneumatic weight carrying cushion substantially coextensive with said bearers and interposed between them, said cushion being vertically relatively shallow and serving to support the body above the cradle for the greater portion of the width of the body, said pneumatic cushion being bolted to both the upper and lower bearers to securely anchor it to both of them.

11. A vehicle comprising: a body having a frame, a wheeled axle beneath said frame, a cradle positioned below the frame with one end of the cradle secured to the axle and its other end secured to the frame, a lower cushion bearer carried by the cradle intermediate the ends of the latter, said cushion bearer being laterally centralized beneath the frame and extending transversely thereof and underlying a greater portion of the width of the body and said bearer being of substantially the same fore and aft dimension, an upper cushion bearer coextensive and alined with the lower bearer and secured to the frame above the latter, a pneumatic weight carrying cushion substantially coextensive with said bearers and interposed between them, said cushion being vertically relatively shallow and serving to support the body above the cradle for the greater portion of the width of the body, and flexible ties connecting the upper and lower bearers at their opposite sides and fore and aft and closely embracing the periphery of the cushion, said flexible ties being substantially taut under all degrees of compression of the cushion to take up side sway of the body, aline the wheels and act as snubbers.

12. A vehicle comprising a body having a frame, a wheeled axle beneath the frame, an upper bearer positioned below the frame and mounted thereon, a lower bearer subjacent the upper bearer and mounted on the axle, a pneumatic cushion positioned between the upper and lower bearers and anchored to both of them, and flexible ties connecting the upper and lower bearers at their opposite sides and closely embracing the periphery of the pneumatic cushion at all times, said flexible ties being substantially taut under all degrees of compression of the cushion and in contact therewith at all times to take up side sway of the body, aline the wheels and act as snubbers.

13. A vehicle according to claim 12, wherein additional flexible ties are also connected to the upper and lower bearers at both the front and back portions of said bearers.

14. A vehicle according to claim 12, wherein the bearers and cushion are of generally circular shape in plan and wherein the flexible ties are positioned both fore and aft and at opposite lateral sides of such cushion.

RENE GOUIRAND.

REFERENCES CITED

The following references are of record in the file of this patent:

UNITED STATES PATENTS

| Number | Name | Date |
|---|---|---|
| 1,337,579 | Amory | Apr. 20, 1920 |
| 1,580,817 | Dupuy | Apr. 13, 1926 |
| 1,595,233 | Kriegbaum | Aug. 20, 1926 |
| 1,648,908 | Mercier | Nov. 15, 1927 |
| 1,650,680 | Youse | Nov. 29, 1927 |
| 2,047,971 | Larsen | July 21, 1931 |
| 2,141,165 | Armington | Dec. 17, 1938 |
| 2,150,576 | Bell | Mar. 14, 1939 |
| 2,180,876 | Kuhn | Nov. 21, 1939 |

FOREIGN PATENTS

| Number | Country | Date |
|---|---|---|
| 258,817 | Italy | June 2, 1928 |